United States Patent
Hagihara et al.

(10) Patent No.: US 11,477,348 B2
(45) Date of Patent: Oct. 18, 2022

(54) PRINTING DEVICE AND PRINTING METHOD

(71) Applicant: Seiko Epson Corporation, Tokyo (JP)

(72) Inventors: Naoki Hagihara, Shiojiri (JP); Takahiro Kamada, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/496,852

(22) Filed: Oct. 8, 2021

(65) Prior Publication Data
US 2022/0116514 A1    Apr. 14, 2022

(30) Foreign Application Priority Data
Oct. 9, 2020 (JP) .............................. JP2020-171065

(51) Int. Cl.
*H04N 1/60* (2006.01)
*H04N 1/62* (2006.01)

(52) U.S. Cl.
CPC ........... *H04N 1/605* (2013.01); *H04N 1/6019* (2013.01); *H04N 1/6058* (2013.01); *H04N 1/626* (2013.01)

(58) Field of Classification Search
CPC .... H04N 1/605; H04N 1/6019; H04N 1/6058; H04N 1/626
See application file for complete search history.

(56) References Cited

U.S. PATENT DOCUMENTS

| | | | | |
|---|---|---|---|---|
| 5,734,802 A | * | 3/1998 | Maltz | H04N 1/603 358/1.9 |
| 6,340,975 B2 | * | 1/2002 | Marsden | H04N 1/6058 345/590 |
| 6,532,081 B1 | * | 3/2003 | Cecchi | H04N 1/6058 358/1.9 |
| 7,952,757 B2 | * | 5/2011 | Kaneko | H04N 1/6033 358/1.9 |

(Continued)

FOREIGN PATENT DOCUMENTS

| | | | | |
|---|---|---|---|---|
| EP | 1445941 A1 | * | 8/2004 | ........... G06T 11/001 |
| EP | 1734739 A1 | * | 12/2006 | ........... G11B 27/031 |

(Continued)

*Primary Examiner* — Ted W Barnes
(74) *Attorney, Agent, or Firm* — Harness, Dickey & Pierce, P.L.C.

(57) ABSTRACT

A printing device includes: an ink system having a plurality of types of inks; an image input unit accepting an input of an image to be printed; a print condition selection unit accepting a selection of N types of print conditions used when printing the image, N being an integer equal to or greater than 2; an application rate input unit accepting an input of an application rate of each of the N types of print conditions that are selected; a first ink amount calculation unit calculating an expected amount of ink of each of the plurality of types of inks used when it is assumed that the image is printed using singly each of the N types of print conditions that are selected; a second ink amount calculation unit calculating an actual amount of ink used when printing the image, using the expected amount of ink corresponding (Continued)

to each of the N types of print conditions and the application rates of the N types of print conditions; and a printing unit executing printing of the image according to the actual amount of ink.

5 Claims, 7 Drawing Sheets

(56) References Cited

U.S. PATENT DOCUMENTS

| | | | | |
|---|---|---|---|---|
| 2003/0001860 A1* | 1/2003 | Yamazaki | ............ | H04N 1/6058 345/590 |
| 2005/0219569 A1* | 10/2005 | Yamamoto | ............ | B41J 2/2114 358/1.9 |
| 2006/0087665 A1* | 4/2006 | Wang | ............ | H04N 1/6019 358/1.9 |
| 2007/0058181 A1* | 3/2007 | Hatori | ............ | H04N 1/6058 358/1.9 |
| 2010/0157338 A1* | 6/2010 | Nakamura | ............ | H04N 1/6088 358/1.9 |
| 2011/0116137 A1* | 5/2011 | Uratani | ............ | H04N 1/6058 358/3.23 |
| 2013/0286440 A1* | 10/2013 | Okumura | ............ | H04N 1/54 358/3.06 |
| 2016/0019015 A1* | 1/2016 | Hirasawa | ............ | G06F 3/1218 358/2.1 |
| 2017/0266981 A1* | 9/2017 | Chang | ............ | B41J 2/2103 |
| 2017/0358063 A1* | 12/2017 | Chen | ............ | H04N 1/6008 |
| 2018/0063381 A1* | 3/2018 | Takesue | ............ | G01J 3/524 |
| 2020/0045207 A1* | 2/2020 | Morovic | ............ | G06F 3/1208 |
| 2020/0364015 A1* | 11/2020 | Katsuzawa | ............ | G06F 3/1255 |

FOREIGN PATENT DOCUMENTS

| | | | | | |
|---|---|---|---|---|---|
| EP | 1887788 A2 | * | 2/2008 | ............ | H04N 1/6019 |
| JP | 2009-188948 A | | 8/2009 | | |
| JP | 2013-132016 A | | 7/2013 | | |
| JP | 2018032941 A | * | 3/2018 | ............ | G01J 3/462 |
| JP | 6305049 B2 | * | 4/2018 | ............ | G06T 7/90 |

* cited by examiner

PRINTING DEVICE AND PRINTING METHOD

The present application is based on, and claims priority from JP Application Serial Number 2020-171065, filed Oct. 9, 2020, the disclosure of which is hereby incorporated by reference herein in its entirety.

BACKGROUND

1. Technical Field

The present disclosure relates to a printing device and a printing method.

2. Related Art

JP-A-2009-188948 discloses an image processing device and an image processing method in which a color conversion lookup table (LUT) corresponding to each of a plurality of reference light sources is prepared in advance and in which a profile and a color conversion LUT corresponding to a particular light source are generated by interpolation of color temperature using a color temperature of the particular light source and a color temperature of the reference light source.

A printing device may, in some cases, use a fluorescent ink or a spot color ink in addition to inks of the three primary colors of pigment. The fluorescent ink differs from the other inks in characteristics such as light resistance. Therefore, there is a demand to be able to change the amount of the fluorescent ink used. This is not limited to the fluorescent link and similarly applies to the spot color ink. Therefore, in a printing device and a printing method, a function of arbitrarily and easily setting a ratio of the amount of the ink used, without calculating a new LUT, and executing printing accordingly, is demanded. The related-art technique generates a LUT by interpolation of color temperature and therefore cannot prepare a LUT taking a plurality of types of ink amounts into account.

SUMMARY

According to an aspect of the present disclosure, a printing device is provided. The printing device includes: an ink system having a plurality of types of inks; an image input unit accepting an input of an image to be printed; a print condition selection unit accepting a selection of N types of print conditions used when printing the image, N being an integer equal to or greater than 2; an application rate input unit accepting an input of an application rate of each of the N types of print conditions that are selected; a first ink amount calculation unit calculating an expected amount of ink of each of the plurality of types of inks used when it is assumed that the image is printed using singly each of the N types of print conditions that are selected; a second ink amount calculation unit calculating an actual amount of ink used when printing the image, using the expected amount of ink corresponding to each of the N types of print conditions and the application rates of the N types of print conditions; and a printing unit executing printing of the image according to the actual amount of ink.

According to another aspect of the present disclosure, a printing method for printing using a plurality of types of inks is provided. The printing method includes: accepting an input of an image to be printed; accepting a selection of N types of print conditions used when printing the image, N being an integer equal to or greater than 2; accepting an input of an application rate of each of the N types of print conditions that are selected; calculating an expected amount of ink of each of the plurality of types of inks used when it is assumed that the image is printed using singly each of the N types of print conditions that are selected; calculating an actual amount of ink used when printing the image, using the expected amount of ink corresponding to each of the N types of print conditions and the application rates of the N types of print conditions; and executing printing of the image according to the actual amount of ink.

DESCRIPTION OF EXEMPLARY EMBODIMENTS

Embodiment

Figure 1:
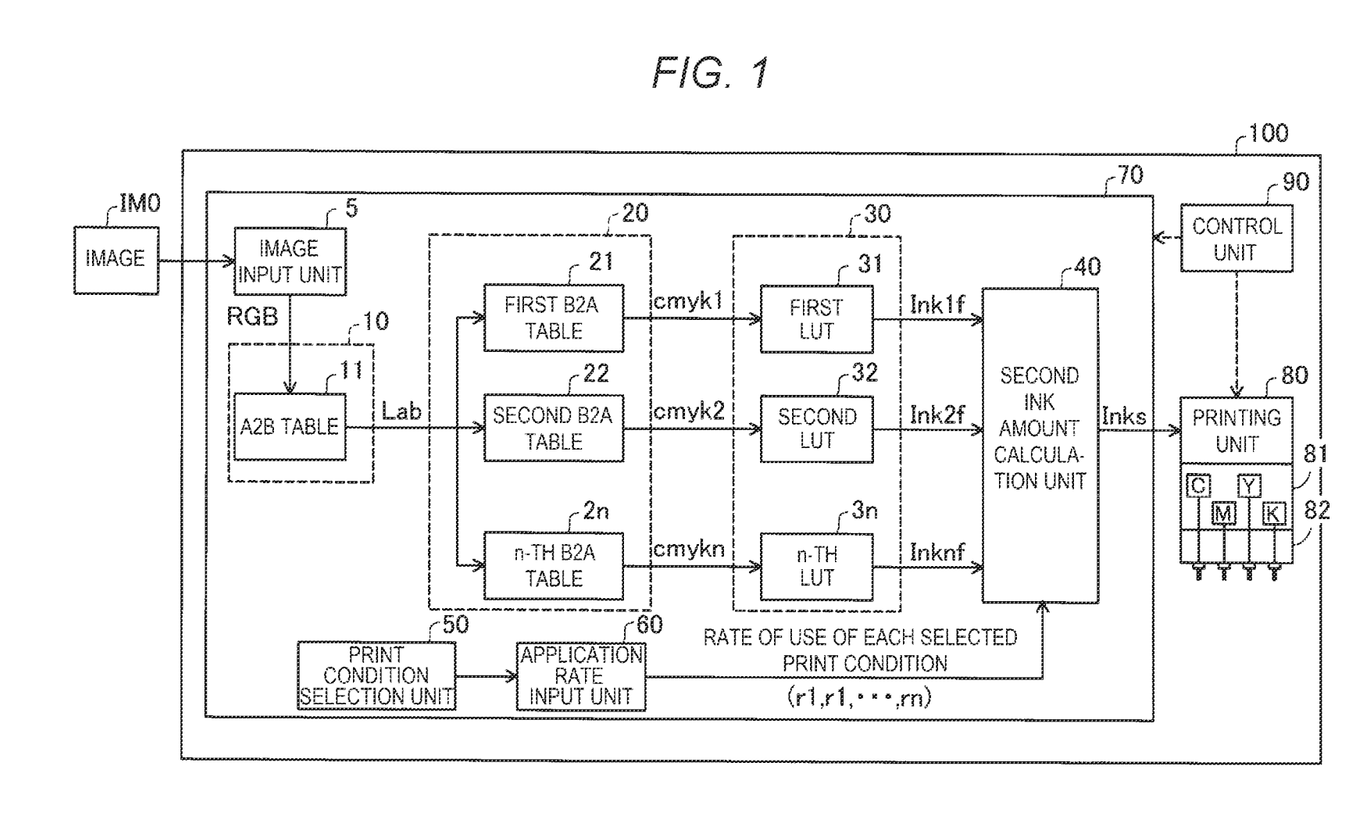
FIG. 1 is an explanatory view showing the configuration of a printing device according to an embodiment.

FIG. 1 is an explanatory view showing the configuration of a printing device 100 according to an embodiment. The printing device 100 executes printing of an inputted image IM0. The printing device 100 has a color conversion unit 70, a printing unit 80, and a control unit 90. The color conversion unit 70 performs color conversion of RGB data of each pixel of the image IM0 and thus prepares an actual amount of ink Inks to be sent to the printing unit 80. The printing unit 80 has an ink system 81 that can supply a plurality of types of inks to a print head. The ink system 81 refers to a configuration for supplying a plurality of types of inks used in combination to print an image, to a print head 82. The ink system 81 prepared in the printing unit 80 in this embodiment can supply inks of cyan (C), magenta (M), yellow (Y), light cyan (LC), and light magenta (LM), that is, the three primary colors of pigment, a black ink (K), and a spot color ink, to the print head. In FIG. 1, for the sake of convenience of the illustration, only the inks of cyan (C), magenta (M), yellow (Y), and black (K) are shown. The printing unit 80 executes printing according to the actual amount of ink Inks sent from the color conversion unit 70, using the ink system 81. In the ink system 81, a suitable combination of spot color inks selected from fluorescent inks (fluorescent pink (FP), fluorescent yellow (FY)) and other spot color inks (red (R), green (G), blue (B)) than the fluorescent inks can be loaded as the spot color ink. Therefore, there is a case where no spot color ink is loaded. The ink system 81 used in each embodiment described below, that is, the combination of a plurality of types of inks, will be described in each embodiment. The control unit 90 controls the operation of the color conversion unit 70 and the printing unit 80.

The color conversion unit 70 has an image input unit 5, a first color conversion unit 10, a second color conversion unit 20, a first ink amount calculation unit 30, a second ink amount calculation unit 40, a print condition selection unit 50, and an application rate input unit 60. Each unit in the color conversion unit 70 is implemented, for example, by a computer program executed by the control unit 90.

The image input unit 5 accepts an input of the image IM0 and sends gradation data represented in an RGB space of each pixel of the image IM0 to the first color conversion unit 10. In this embodiment, the image input unit 5 outputs gradation data RGB represented in the RGB space of the image IM0. However, gradation data represented in a CMYK space or other color spaces may be employed.

The first color conversion unit 10 converts the gradation data represented in the RGB space, which is a device-dependent color space, of the image IM0, into a color value represented in a device-independent color space. The first color conversion unit 10 has an A2B table 11, which is an ICC (International Color Consortium) profile describing the correlation between a device-dependent color space such as an RGB color space dependent on a particular device that is handled and a device-independent color space such as a CIE (International Commission on Illumination) L*a*b* color space. The first color conversion unit 10, using the A2B table 11, converts the gradation data RGB represented in the RGB space of the image IM0 into a color value Lab represented in a LAB color space. In the description below, the CIE L*a*b* color space is referred to as LAB color space.

The second color conversion unit 20 converts the color value Lab represented in the LAB color space, which is a device-independent color space, into gradation data represented in a device-dependent color space such as a CMYK color space dependent on the printing unit 80. In this embodiment, even when the configuration of the printing unit 80 is the same, the second color conversion unit 20 performs different color conversions under different print conditions. Therefore, the second color conversion unit 20 has n B2A tables 21 to 2n corresponding to n types of print conditions and generates n gradation data cmyk1 to cmykn represented in the CMYK space. The n types of print conditions include, for example, the following print conditions.

(a) a print condition that the inks of the three primary colors of pigment and the black (K) ink are used;

(b) a print condition that the inks of light cyan (LC) and light magenta (LM) are used in addition to the print condition (a);

(c) a print condition that a spot color ink that is neither the inks of the three primary colors of pigment nor the black ink is used in addition to the print condition (a);

(c1) a print condition that the spot color ink in the print condition (c) is a fluorescent ink; and (c2) a print condition that the spot color ink in the print condition (c) is not a fluorescent ink, that is, a print condition that a "non-fluorescent spot color ink" is used as the spot color ink The above print conditions are examples and not limiting. For example, the print conditions (c1) and (c2) may include the use of the inks of light cyan (LC) and light magenta (LM), or the use of the black ink may be excluded from the conditions (a) to (c). There may also be a condition corresponding to the color and gloss of the medium used for printing. A necessary spot color ink is specified according to the print condition and loaded in the printing device 100.

The first ink amount calculation unit 30 has n LUTs 31 to 3n calculated in advance, corresponding to the n B2A table 21 to 2n, respectively, and calculates n expected amounts of ink Ink1f to Inknf corresponding respectively to the n gradation data cmyk1 to cmykn represented in the CMYK space, based on the gradation data cmyk1 to cmykn. The expected amount of ink means the amount of ink used for printing the image IM0 on the assumption that the image is printed using a single print condition. The LUTs 31 to 3n are stored in the first ink amount calculation unit 30.

The print condition selection unit 50 accepts a selection of N types of print conditions used when printing the image IM0, N being an integer equal to or greater than 2, from the n types of print conditions. The application rate input unit 60 accepts the application rate of each of the selected N types of print conditions. The application rate of each print condition is inputted by a user, taking into account the light resistance of the ink, the cost, the amount of ink remaining, and the like. For example, when the print condition selection unit 50 selects three print conditions, that is, a first print condition, a second print condition, and a third print condition, the application rate input unit 60 accepts the application rates of two print conditions of the first print condition, the second print condition, and the third print condition. The total of the application rates of the three print conditions is 100%. Therefore, based on the application rates of two print conditions, the application rate of the remaining one print condition can be calculated.

The second ink amount calculation unit 40 calculates the actual amount of ink Inks used when printing the image IM0, using the n expected amounts of ink Ink1f to Inknf and the n application rates. The application rate of a print condition that is not selected as a print requirement is zero and therefore has no effect on the actual amount of ink Inks.

Figure 2:
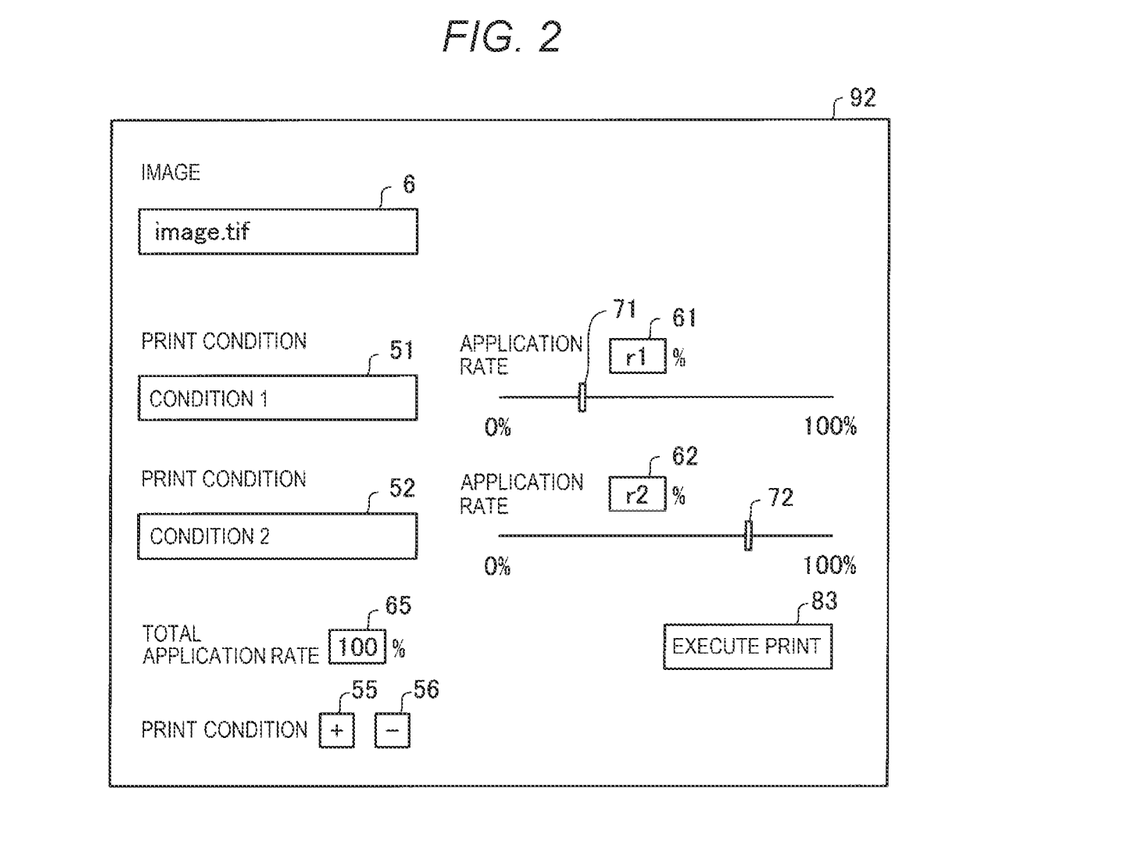
FIG. 2 is an explanatory view showing an operation screen of the printing device.

FIG. 2 is an explanatory view showing an operation screen 92 of the printing device 100. The operation screen includes an image input field 6, print condition input fields 51, 52, a print condition add button 55, a print condition delete button 56, application rate input fields 61, 62, application rate input sliders 71, 72, a total application rate display field 65, and a print execution button 83. The image input field 6 is a field for inputting an image to be printed by the printing device 100. A click on the image input field 6 displays an image selection dialog. The user selects an image, using this image selection dialog.

The print condition input fields 51, 52 are fields for selecting a print condition. A click on the print condition input field 51 shows selectable print conditions in a pull-down menu. The user selects one print condition from the print conditions shown in the pull-down menu. Similarly, a click on the print condition input field 52 shows selectable print conditions in a pull-down menu. A print condition already selected in the print condition input field 51 is, for example, shown in gray in the print condition input field 52 and not available for selection. The user selects one print condition from the print conditions shown in the pull-down menu.

The print condition add button 55 and the print condition delete button 56 are buttons for increasing and decreasing the number of print condition input fields. A click on the print condition add button 55 adds a new print condition input field below the print condition input field 52 and adds one application rate input field and one application rate input slider below the application rate input field 62 and the application rate input slider 72. A click on the print condition delete button 56 deletes the print condition input field, the application rate input field, and the application rate input slider located at the bottom. For example, a click on the print condition delete button 56 in the state shown in FIG. 2 deletes the print condition input field 52, the application rate input field 62, and the application rate input slider 72.

The application rate input fields 61, 62 are fields for the user to input application rates r1, r2 of the print conditions shown in the print condition input fields 51, 52, respectively. Each of the application rates r1, r2 is a value equal to or higher than 0% and equal to or lower than 100%. The total of the application rates r1, r2 is 100%. Therefore, when there are only two application rate input fields and the application rate r1 is inputted in the application rate input field 61, which is one of the application rate input fields, a value of 100−r1 is automatically inputted and shown as the application rate in the other application rate input field 62. On the other hand, when the application rate r2 is inputted in the application rate input field 62, a value of 100−r2 is automatically inputted and shown as the application rate in the other application rate input field 61. When there are n application rate input fields, n being an integer equal to or greater than 3, and an application rate is inputted in the n−1 application rate input fields, an application rate calculated by a similar computation is automatically inputted and shown in the remaining application rate input field.

The application rate input sliders 71, 72 allow the user to move the sliders to input the application rates r1, r2 of the print conditions shown in the print condition input fields 51, 52, respectively. The application rate input field 61 and the application rate input slider 71 are linked together. When the user changes one of these, the other automatically changes. The same applies to the application rate input field 62 and the application rate input sliders 72. The operation screen 92 may show the application rates in a pie chart instead of the application rate input sliders 71, 72.

The total application rate display field 65 displays the total of the inputted application rates. Normally, the total of the application rates is 100%. Therefore, the total application rate display field 65 can be omitted. The print execution button 83 is a button accepting execution of printing.

Figure 3:
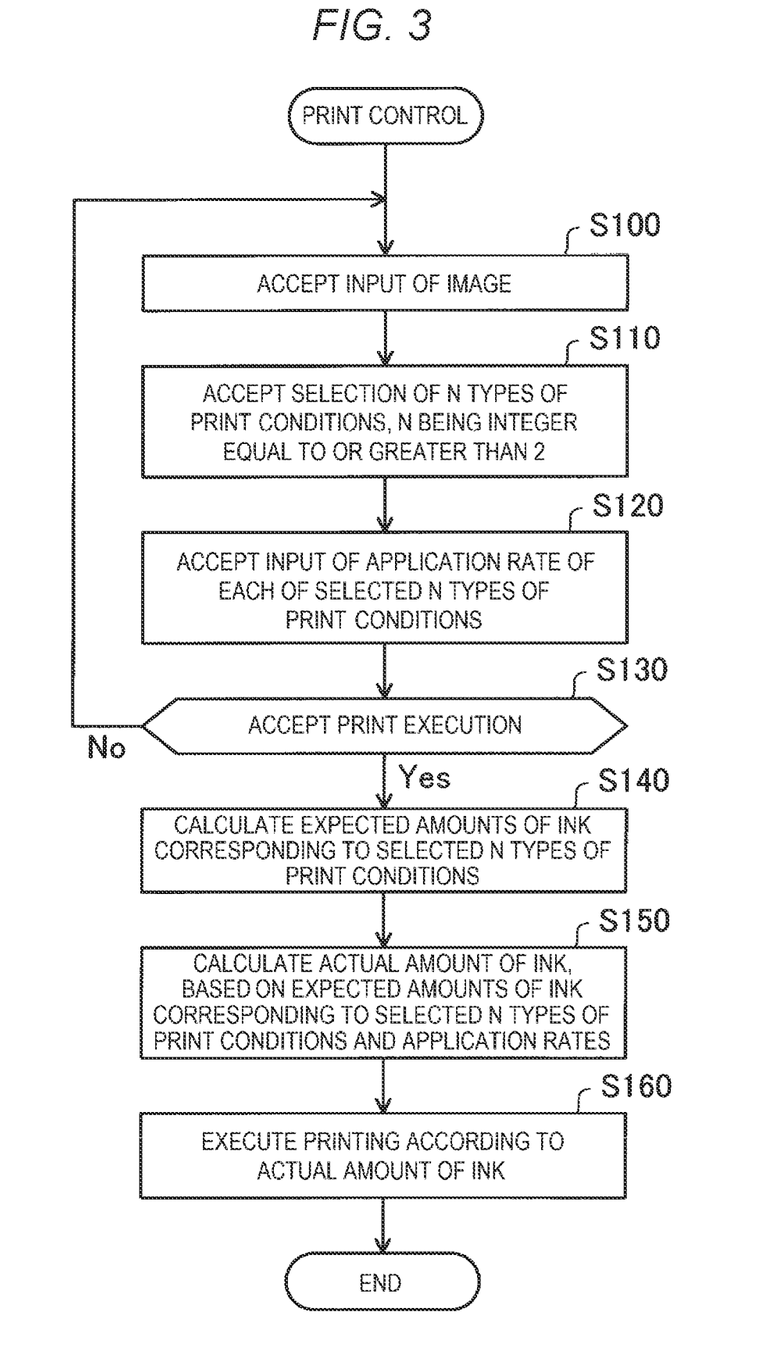
FIG. 3 is a flowchart of print control executed by a control unit of the printing device.

FIG. 3 is a flowchart of print control executed by the control unit 90 of the printing device 100. In step S100, the control unit 90 displays the operation screen 92 and accepts an input of the image IM0. In step S110, the control unit 90 accepts a selection of N types of print conditions, N being an integer equal to or greater than 2, based on a selection made by the user in the print condition input fields 51, 52, the print condition add button 55, and the print condition delete button 56 on the operation screen 92.

In step S120, the control unit 90 accepts an input of the application rate of each of the N types of print conditions via the application rate input fields 61, 62 or the application rate input sliders 71, 72 on the operation screen 92. As described above, the sum of the application rates of the N types of print conditions is 100%.

When a print execution instruction to the print execution button 83 on the operation screen 92 is accepted in step S130, the control unit 90 shifts the processing to step S140. When a print execution instruction to the print execution button 83 is not accepted, the control unit 90 returns the processing to step S100. During the period when a print execution instruction to the print execution button 83 is not accepted, the control unit 90 can accept a re-input and a reselection of any of the image, the print conditions, and the application rate of each print condition.

In step S140, the control unit 90 causes the first ink amount calculation unit 30 to calculate expected amounts of ink corresponding to the N-types of print conditions, for each pixel of the image IM0. In step S150, the control unit 90 causes the second ink amount calculation unit 40 to calculate an actual amount of ink, based on the expected amounts of ink corresponding to the N types of print conditions and the application rates of the N types of print conditions, for each pixel of the image IM0. In step S160, the control unit 90 sends data of the actual amount of ink calculated for each pixel of the image IM0 to the printing unit 80 and thus executes printing.

In step S110, the number of print conditions selected may be only one. In this case, step S120 is not executed and the actual amount of ink in step S150 coincides with the expected amount of ink in step S140.

Combinations of print conditions will now be described, using some examples.

First Example

Figure 4:
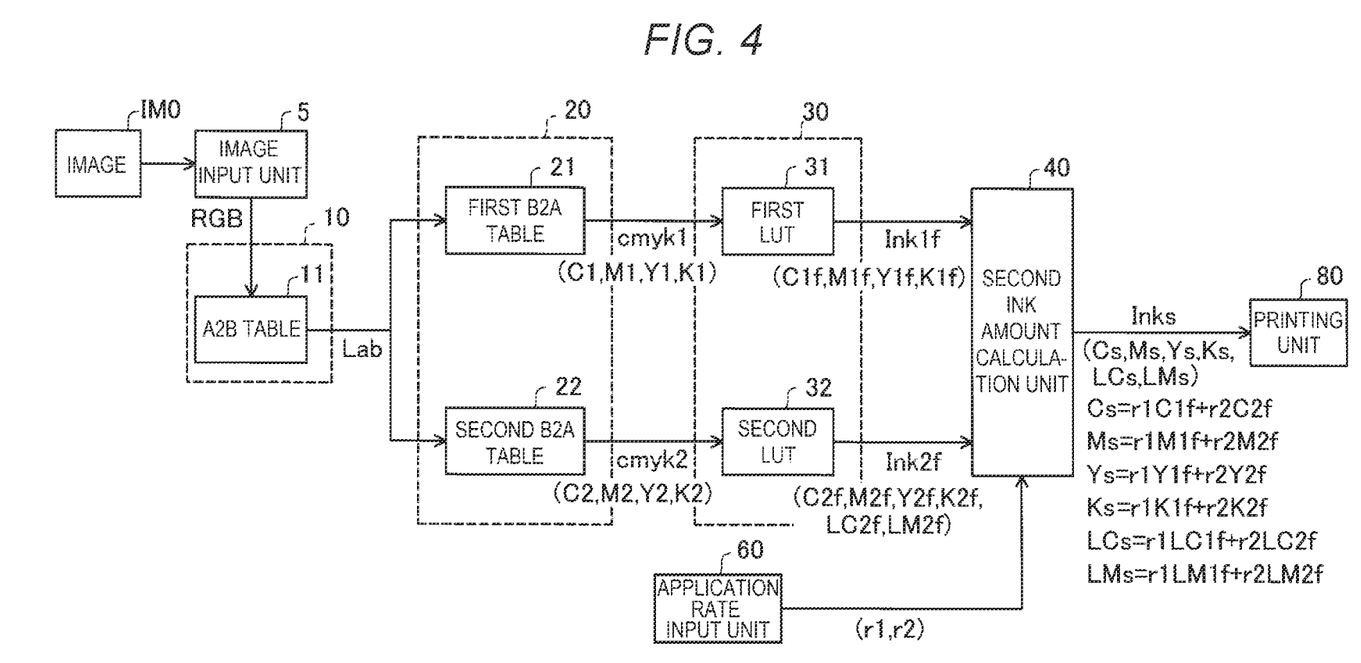
FIG. 4 is an explanatory view for explaining a combination of a print condition (a) and a print condition (b).

FIG. 4 is an explanatory view for explaining a combination of the print condition (a) and the print condition (b). As described above, the print condition (a) is that inks of the three primary colors of pigment and a black ink are used. The print condition (b) is that inks of light cyan and light magenta are used in addition to the inks of the three primary colors of pigment and the black ink. For the print condition (a), the first B2A table 21 and the first LUT 31 are used. For the print condition (b), the second B2A table 22 and the second LUT 32 are used.

The control unit 90 causes the first color conversion unit 10 to convert gradation data RGB represented in the RGB space of the image IM0 inputted to the image input unit 5 into a color value Lab represented in the Lab space, using the A2B table 11. Next, the control unit 90 causes the second color conversion unit 20 to convert the color value Lab represented in the Lab space into gradation data cmyk1 (=(C1, M1, Y1, K1)) represented in the CMYK space, using the first B2A table 21. The control unit 90 also causes the second color conversion unit 20 to convert the color value Lab represented in the Lab space into gradation data cmyk2 (=(C2, M2, Y2, K2)) represented in the CMYK space, using the second B2A table 22.

The control unit 90 causes the first ink amount calculation unit 30 to convert the gradation data cmyk1 represented in the CMYK color space into an expected amount of ink Ink1$f$ (=(C1$f$, M1$f$, Y1$f$, K1$f$)), using the first LUT 31, and to convert the gradation data cmyk2 represented in the CMYK space into an expected amount of ink Ink2$f$ (=(C2$f$, M2$f$, Y2$f$, K2$f$, LC2$f$, LM2$f$)), using the second LUT 32.

The control unit 90 causes the second ink amount calculation unit 40 to calculate an actual amount of ink INKs (=(Cs, Ms, Ys, Ks, LCs, LMs)), based on the expected amount of ink Ink1$f$ corresponding to the print condition (a) and the application rate r1 thereof, and the expected amount of ink Ink2$f$ corresponding to the print condition (b) and the application rate r2 thereof. The actual amount of ink INKs (=(Cs, Ms, Ys, Ks, LCs, LMs)) is calculated as shown in the equations given below. In the application rate input fields 61, 62, the application rates r1, r2 are shown in percentage. In the equations given below, r1 shown in percentage divided by 100%, that is, r1/100, is given as r1. The same applies to the equations in the illustration.

$$Cs = r1C1f + r2C2f$$

$$Ms = r1M1f + r2M2f$$

$$Ys = r1Y1f + r2Y2f$$

$$Ks = r1K1f + r2K2f$$

$$LCs = r1LC1f + r2LC2f = r2LC2f$$

$$LMs = r1LM1f + r2LM2f = r2LM2f$$

The reason why r1LC1f and r1LM1f can be erased from the bottom two equations of the above six equations is that LC1f and LM1f are zero under the print condition (a).

Second Example

Figure 5:
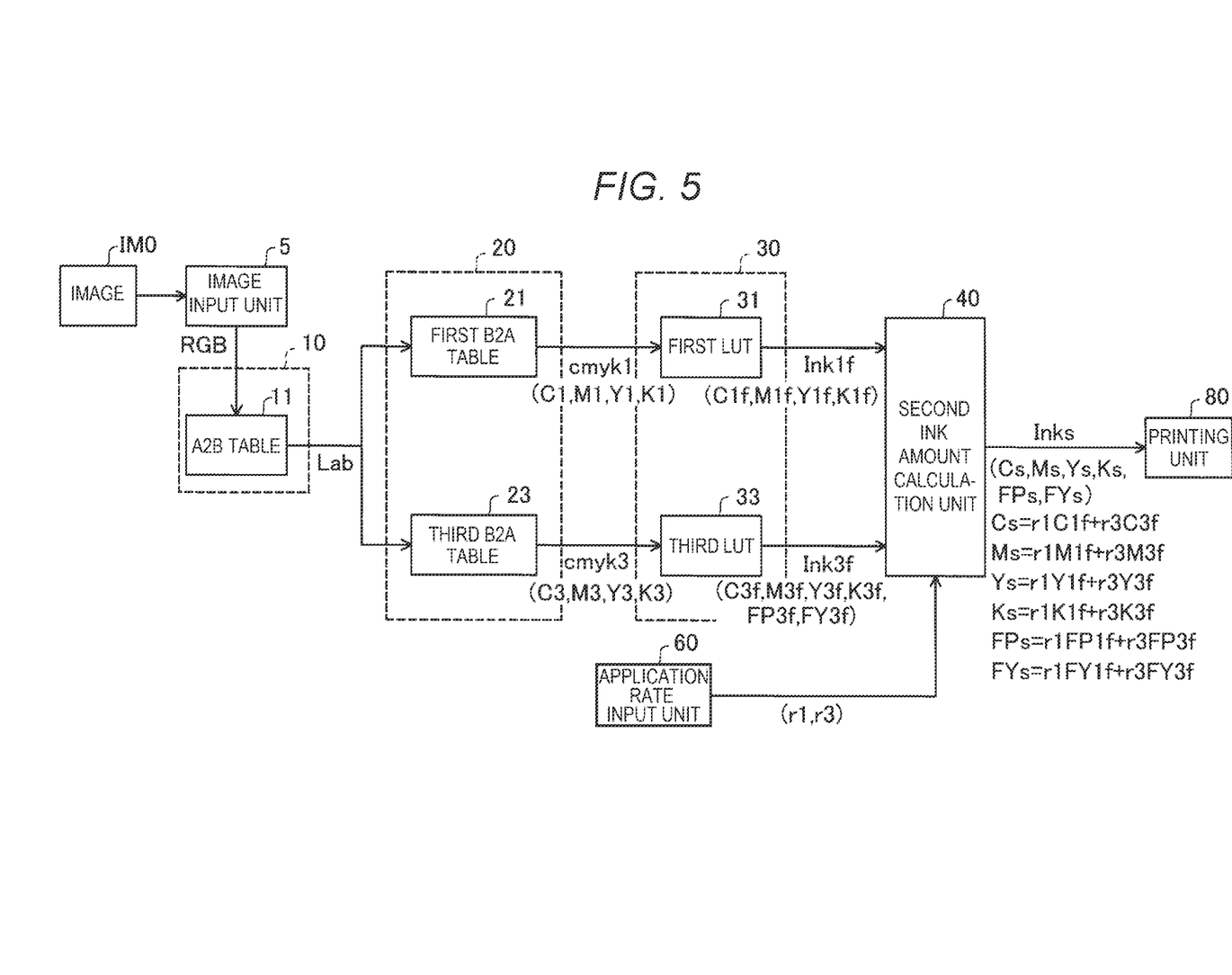
FIG. 5 is an explanatory view for explaining a combination of the print condition (a) and a print condition (c1).

FIG. 5 is an explanatory view for explaining a combination of the print condition (a) and the print condition (c1). The print condition (c1) is that inks of the three primary colors of pigment, a black (K) ink, and a fluorescent ink are used. In the example shown in FIG. 5, inks of fluorescent pink (FB) and fluorescent yellow (FY) are used as the fluorescent ink. However, other fluorescent inks such as inks of fluorescent blue (FB) and fluorescent green (FG) may be used. For the print condition (c1), a third B2A table 23 and a third LUT 33 are used.

Up to the conversion into a color value Lab represented in the Lab space, the same processing as described above is performed. Therefore, the subsequent processing will now be described. The control unit 90 causes the second color conversion unit 20 to convert the color value Lab represented in the Lab space into gradation data cmyk1 (=(C1, M1, Y1, K1)) represented in the CMYK space, using the first B2A table 21. The control unit 90 also causes the second color conversion unit 20 to convert the color value Lab represented in the Lab space into gradation data cmyk3 (=(C3, M3, Y3, K3)) represented in the CMYK space, using the third B2A table 23.

The control unit 90 causes the first ink amount calculation unit 30 to convert the gradation data cmyk1 represented in the CMYK space into an expected amount of ink Ink1f (=(C1f, M1f, Y1f, K1f)), using the first LUT 31. The control unit 90 also causes the first ink amount calculation unit 30 to convert the gradation data cmyk3 represented in the CMYK space into an expected amount of ink Ink3f (=(C3f, M3f, Y3f, K3f, FP3f, FY3f)), using the third LUT 33.

The control unit 90 causes the second ink amount calculation unit 40 to calculate an actual amount of ink INKs(=(Cs, Ms, Ys, Ks, FPs, FYs)), based on the expected amount of ink Ink1f corresponding to the print condition (a) and the application rate r1 thereof, and the expected amount of ink Ink3f corresponding to the print condition (c1) and the application rate r3 thereof. The actual amount of ink INKs (=(Cs, Ms, Ys, Ks, FPs, FYs)) is calculated as shown in the equations given below.

$$Cs = r1C1f + r3C3f$$

$$Ms = r1M1f + r3M3f$$

$$Ys = r1Y1f + r3Y3f$$

$$Ks = r1K1f + r3K3f$$

$$FPs = r1FP1f + r3FP3f = r3FP3f$$

$$FYs = r1FY1f + r3FY3f = r3FY3f$$

The reason why r1FP1f and r1FY1f can be erased from the bottom two equations of the above six equations is that FP1f and FY1f are zero under the print condition (a).

Third Example

Figure 6:
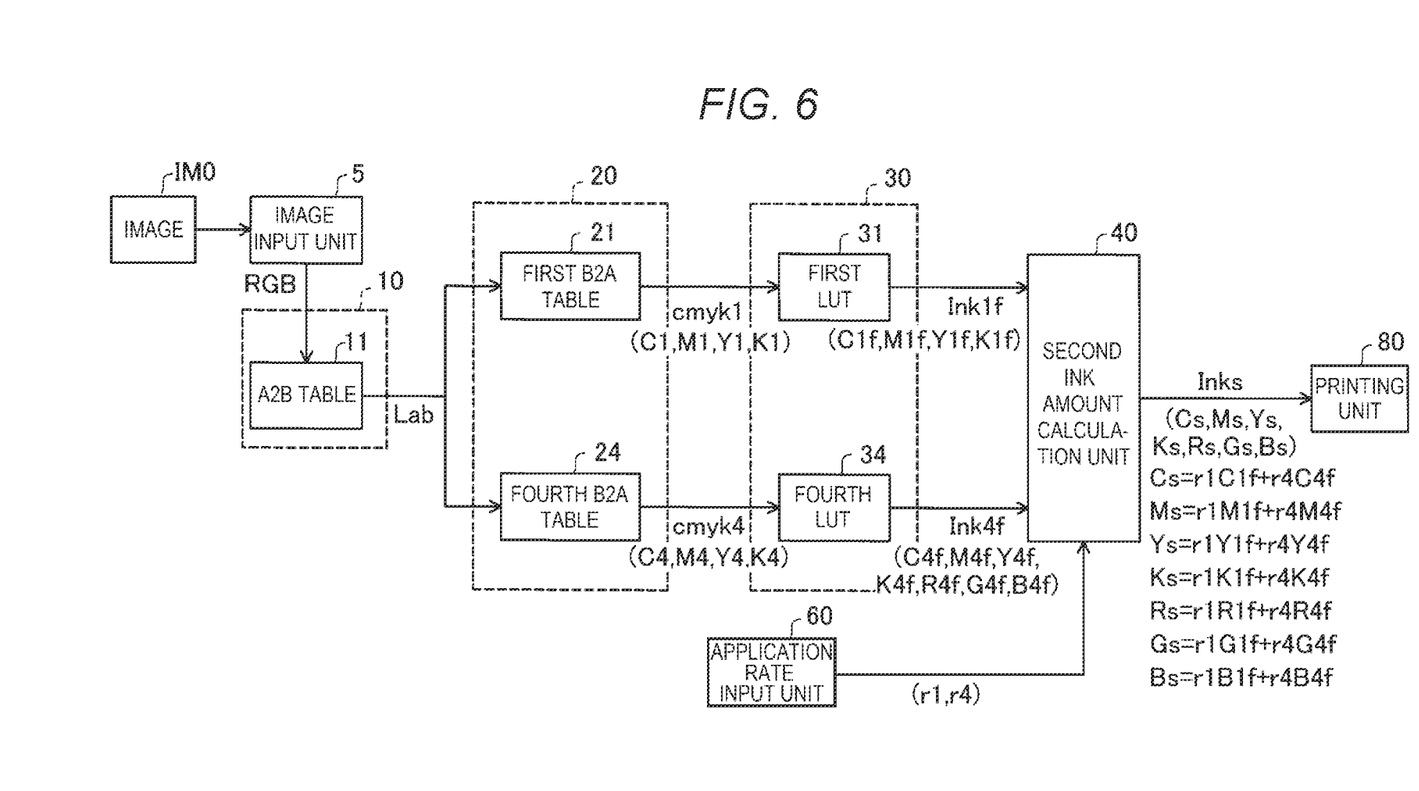
FIG. 6 is an explanatory view for explaining a combination of the print condition (a) and a print condition (c2).

FIG. 6 is an explanatory view for explaining a combination of the print condition (a) and the print condition (c2). The print condition (c2) is that inks of the three primary colors of pigment, a black (K) ink, and a spot color ink that is not a fluorescent ink, are used. In the example shown in FIG. 6, red (R), green (G), and blue (B) inks are used as the spot color ink. For the print condition (c2), a fourth B2A table 24 and a fourth LUT 34 are used.

The control unit 90 causes the second color conversion unit 20 to convert the color value Lab represented in the Lab space into gradation data cmyk1 (=(C1, M1, Y1, K1)) represented in the CMYK space, using the first B2A table 21. The control unit 90 also causes the second color conversion unit 20 to convert the color value Lab represented in the Lab space into gradation data cmyk4 (=(C4, M4, Y4, K4)) represented in the CMYK space, using the fourth B2A table 24.

The control unit 90 causes the first ink amount calculation unit 30 to convert the gradation data cmyk1 represented in the CMYK space into an expected amount of ink Ink1f (=(C1f, M1f, Y1f, K1f)), using the first LUT 31. The control unit 90 also causes the first ink amount calculation unit 30 to convert the gradation data cmyk4 represented in the CMYK space into an expected amount of ink Ink4f (=(C4f, M4f, Y4f, K4f, R4f, G4f, B4f)), using the fourth LUT 34.

The control unit 90 causes the second ink amount calculation unit 40 to calculate an actual amount of ink INKs (=(Cs, Ms, Ys, Ks, Rs, Gs, Bs)), based on the expected amount of ink Ink1f corresponding to the print condition (a) and the application rate r1 thereof, and the expected amount of ink Ink4f corresponding to the print condition (c2) and the application rate r4 thereof. The actual amount of ink INKs (=(Cs, Ms, Ys, Ks, Rs, Gs, Bs)) is calculated as shown in the equations given below.

$$Cs = r1C1f + r4C4f$$

$$Ms = r1M1f + r4M4f$$

$$Ys = r1Y1f + r4Y4f$$

$$Ks = r1K1f + r4K4f$$

$$Rs = r1R1f + r4R4f = r4R4f$$

$$Gs = r1G1f + r4G4f = r4G4f$$

$$Bs = r1B1f + r4B4f = r4B4f$$

The reason why r1R1f, r1G1f, and r1B1f can be erased from the bottom three equations of the above seven equations is that R1f, G1f, and B1f are zero under the print condition (a).

Fourth Example

Figure 7:
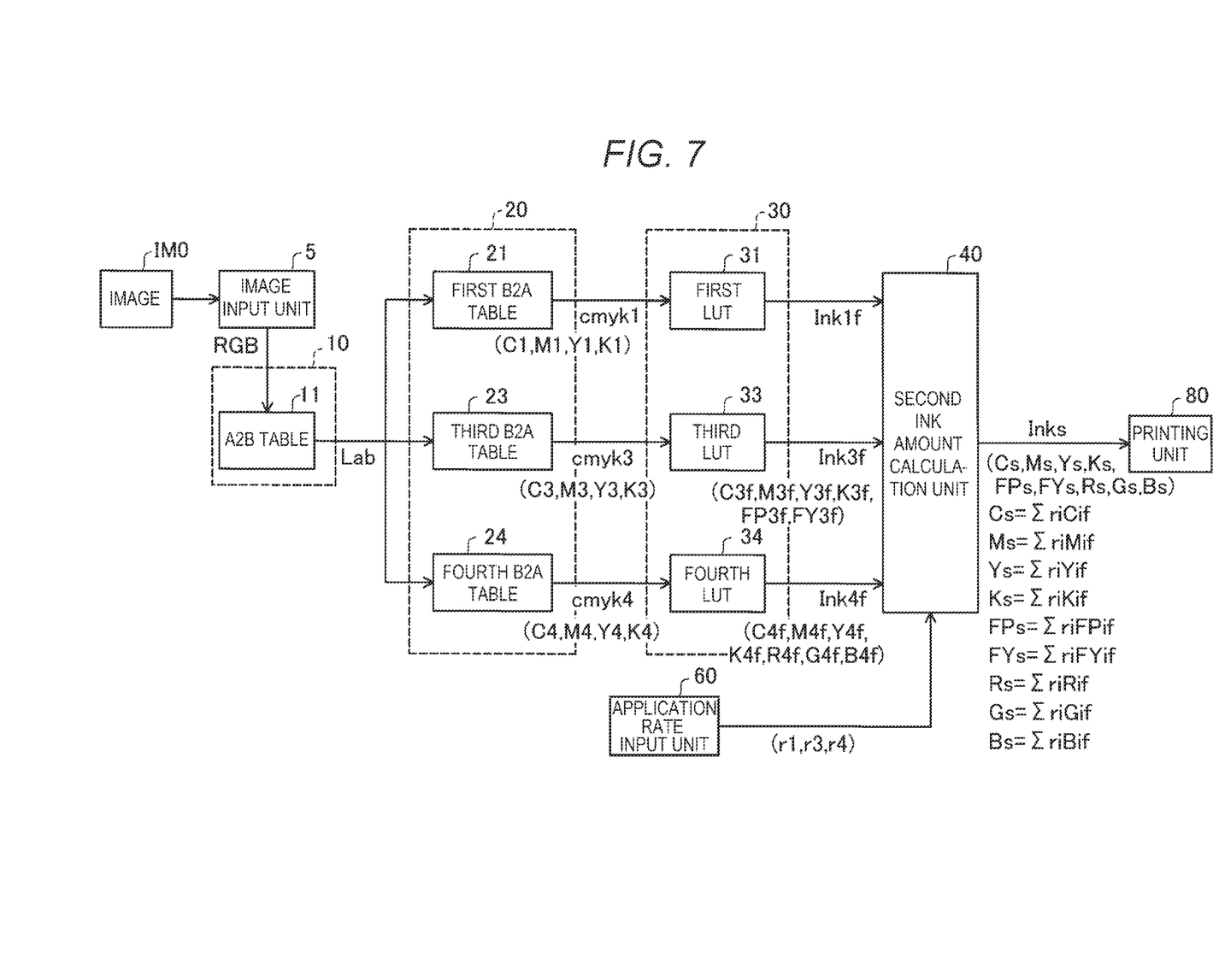
FIG. 7 is an explanatory view for explaining a combination of the print condition (a), the print condition (c1), and the print condition (c2).

FIG. 7 is an explanatory view for explaining a combination of the print condition (a), the print condition (c1), and the print condition (c2). The control unit 90 causes the second color conversion unit 20 to convert the color value Lab represented in the Lab space into gradation data cmyk1 (=(C1, M1, Y1, K1)) represented in the CMYK space, using the first B2A table 21. The control unit 90 also causes the second color conversion unit 20 to convert the color value Lab represented in the Lab space into gradation data cmyk3 (=(C3, M3, Y3, K3)) represented in the CMYK space, using the third B2A table 23. The control unit 90 also causes the second color conversion unit 20 to convert the color value Lab represented in the Lab space into gradation data cmyk4 (=(C4, M4, Y4, K4)) represented in the CMYK space, using the fourth B2A table 24.

The control unit 90 causes the first ink amount calculation unit 30 to convert the gradation data cmyk1 represented in the CMYK space into an expected amount of ink Ink1$f$ (=(C1$f$, M1$f$, Y1$f$, K1$f$)), using the first LUT 31. The control unit 90 also causes the first ink amount calculation unit 30 to convert the gradation data cmyk3 represented in the CMYK space into an expected amount of ink Ink3$f$ (=(C3$f$, M3$f$, Y3$f$, K3$f$, FP3$f$, FY3$f$)), using the third LUT 33. The control unit 90 also causes the first ink amount calculation unit 30 to convert the gradation data cmyk4 represented in the CMYK space into an expected amount of ink Ink4$f$ (=(C4$f$, M4$f$, Y4$f$, K4$f$, R4$f$, G4$f$, B4$f$)), using the fourth LUT 34.

The control unit 90 causes the second ink amount calculation unit 40 to calculate an actual amount of ink INKs (=(Cs, Ms, Ys, Ks, FPs, FYs, Rs, Gs, Bs)), based on the expected amount of ink Ink1$f$ corresponding to the print condition (a) and the application rate r1 thereof, the expected amount of ink Ink3f corresponding to the print condition (c1) and the application rate r3 thereof, and the expected amount of ink Ink4$f$ corresponding to the print condition (c2) and the application rate r4 thereof. The actual amount of ink INKs (=(Cs, Ms, Ys, Ks, FPs, FYs, Rs, Gs, Bs)) is calculated as shown in the equations given below. In the equations given below, $\Sigma$ means the total sum from i=1 to i=n. Here, i is 1, 3, and 4. When i=2, r2=0. In the equations given below, the range of i is obvious and therefore "i=1" below $\Sigma$ and "n" above $\Sigma$ are omitted.

$$Cs = \Sigma riCif = r1C1f + r3C3f + r4C4f$$

$$Ms = \Sigma riMif = r1M1f + r3M3f + r4M4f$$

$$Ys = \Sigma riYif = r1Y1f + r3Y3f + r4Y4f$$

$$Ks = \Sigma riKif = r1K1f + r3K3f + r4K4f$$

$$FPs = \Sigma riFPif = r1FP1f + r3FP3f + r4FP4f = r3FP3f$$

$$FYs = \Sigma riFYif = r1FY1f + r3FY3f + r4FY4f = r3FY3f$$

$$Rs = \Sigma riRif = r1R1f + r3R3f + r4R4f = r4R4f$$

$$Gs = \Sigma riGif = r1G1f + r3G3f + r4G4f = r4G4f$$

$$Bs = \Sigma riBif = r1B1f + r3B3f + r4B4f = r4B4f$$

The reason why r1FP1$f$, r1FY1$f$, r1R1$f$, r1G1$f$, and r1B1$f$ can be erased from the bottom five equations of the above nine equations is that FP1$f$, FY1$f$, R1$f$, G1$f$, and B1$f$ are zero under the print condition (a). Also, the reason why r3R3$f$, r3G3$f$, and r3B3$f$ can be erased is that R3$f$, G3$f$, and B3$f$ are zero under the print condition (c1). Moreover, the reason why r4FP4$f$ and r4FY4$f$ can be erased is that FP4$f$ and FY4$f$ are zero under the print condition (c2).

As described above, according to this embodiment, using the print condition selection unit 50, the control unit 90 of the printing device 100 accepts a selection of N types of print conditions used when printing an image IM0, N being an integer equal to or greater than 2. Using the application rate input unit 60, the control unit 90 accepts an input of an application rate of each of the selected N types of print conditions. Using the first ink amount calculation unit 30, the control unit 90 calculates an expected amount of ink used when it is assumed that the image is printed using singly each of the selected N types of print conditions. Using the second ink amount calculation unit 40, the control unit 90 calculates an actual amount of ink used when printing the image IM0, based on the expected amount of ink corresponding to each of the N types of print conditions and the application rates of the N types of print conditions. The control unit 90 causes the printing unit 80 to execute printing of the image IM0 according to the actual amount of ink. In this embodiment, a profile and LUT are already prepared. The control unit 90 calculates the expected amount of ink, using the already prepared profile and LUT and calculates the actual amount of ink taking the application rate into account. Therefore, a huge amount of calculation to generate the profile and the LUT is not needed. When printing an image, the user may decide the application rate of each print condition, considering the light resistance, the cost, the amount of ink remaining of each color, and the state of the medium (color and gloss of the medium). For example, the user may use the print condition (a) that inks of the three primary colors of pigment and a black (K) ink are used, and may input the application rates of a condition (a1) and a condition (a2), based on the state of the medium.

One of the N types of print conditions may be a print condition that includes using M types of inks, M being an integer equal to or greater than 1. Another one of the N types of print conditions may be a print condition that includes using an ink not including the M types of inks. In this case, the M types of inks may be, for example, a light ink (light cyan or light magenta) as described in the first example. In this case, the print condition (b) is the print condition that includes using the M types of inks, M being an integer equal to or greater than 1. The print condition (a) is the print condition that does not include using the M types of inks, M being an integer equal to or greater than 1.

The M types of inks may be a spot color ink that is an ink other than the inks of the three primary colors of pigment and the black ink. As described in the second example, the spot color ink may be a fluorescent ink. As described in the third example, the spot color ink may be a non-fluorescent spot color ink that is an ink other than the inks of the three primary colors of pigment, the black ink, and the fluorescent ink. Also, as described in the fourth example, the N types of print conditions may be three print conditions, that is, a print condition that does not include the spot color ink and includes the inks of the three primary colors of pigment and the black ink, a print condition that includes the spot color ink, the spot color ink being a fluorescent ink, and a print condition that includes the spot color ink, the spot color ink being a non-fluorescent ink. The N types of print conditions may also be four or more types of print conditions, including a print condition that includes the inks of the three primary colors of pigment, the black ink, and the light ink.

In the embodiment, the condition (a) is selected as one condition. However, the condition (a) may be not selected. For example, a condition that includes only the black ink and a condition that includes only the spot color ink may be selected.

In the embodiment, a part or all of the functions and the processings implemented by software may be implemented by hardware. Also, a part or all of the functions and the processings implemented by hardware may be implemented by software. As the hardware, for example, various circuits such as an integrated circuit, a discrete circuit, or a circuit module formed of a combination of these circuits can be used.

In the embodiment, the second color conversion unit 20 has the B2A tables 21 to 2$n$ corresponding to individual print conditions. However, the second color conversion unit 20 may be configured to have only one B2A table corresponding to the control unit 80. Even when the second color conversion unit 20 is configured to have only one B2A table, the expected amount of ink corresponding to each print condition can be calculated based on the LUT in the first ink amount calculation unit 30.

The present disclosure is not limited to the above embodiment and can be implemented according to various other aspects without departing from the spirit and scope of the present disclosure. For example, the present disclosure can be implemented according to the aspects described below. A technical feature in the embodiment corresponding to a technical feature according to each of the aspects described below can be replaced or combined according to need, in order to solve a part or all of the problems described in the present disclosure or in order to achieve a part or all of the effects of the present disclosure. The technical feature can be deleted according to need, unless described as essential in the specification.

(1) According to an aspect of the present disclosure, a printing device is provided. The printing device includes: an ink system having a plurality of types of inks; an image input unit accepting an input of an image to be printed; a print condition selection unit accepting a selection of N types of print conditions used when printing the image, N being an integer equal to or greater than 2; an application rate input unit accepting an input of an application rate of each of the N types of print conditions that are selected; a first ink amount calculation unit calculating an expected amount of ink of each of the plurality of types of inks used when it is assumed that the image is printed using singly each of the N types of print conditions that are selected; a second ink amount calculation unit calculating an actual amount of ink used when printing the image, using the expected amount of ink corresponding to each of the N types of print conditions and the application rates of the N types of print conditions; and a printing unit executing printing of the image according to the actual amount of ink. According to this aspect, the user can calculate the actual amount of ink used for printing and can execute printing without preparing again a new profile or LUT corresponding to the application rate of the print condition.

(2) In the printing device according to the above aspect, one of the N types of print conditions may be a print condition that includes using M types of inks of the plurality of types of inks, M being an integer equal to or greater than 1. Another one of the N types of print conditions may be a print condition that includes using an ink not including the M types of inks. According to this aspect, the amount of the M types of inks used can be reduced.

(3) In the printing device according to the above aspect, the plurality of types of inks may include inks of three primary colors of pigment and a black ink. The M types of inks may be a spot color ink that is an ink other than the inks of the three primary colors of pigment and the black ink. According to this aspect, the amount of the spot color ink used can be changed.

(4) In the printing device according to the above aspect, one of the N types of print conditions may be a print condition that includes using a fluorescent ink. Another one of the N types of print conditions may be a print condition that includes using an ink not including the fluorescent ink. According to this aspect, the amount of the fluorescent ink used can be changed.

(5) According to another aspect of the present disclosure, a printing method for printing using a plurality of types of inks is provided. The printing method includes: accepting an input of an image to be printed; accepting a selection of N types of print conditions used when printing the image, N being an integer equal to or greater than 2; accepting an input of an application rate of each of the N types of print conditions that are selected; calculating an expected amount of ink of each of the plurality of types of inks used when it is assumed that the image is printed using singly each of the N types of print conditions that are selected; calculating an actual amount of ink used when printing the image, using the expected amount of ink corresponding to each of the N types of print conditions and the application rates of the N types of print conditions; and executing printing of the image according to the actual amount of ink. According to this aspect, the user can calculate the actual amount of ink used for printing and can execute printing without preparing again a new profile or LUT corresponding to the application rate of the print condition.

The present disclosure can be implemented in various other forms than the printing device and the printing method. For example, the present disclosure can be implemented in forms such as a color conversion device and a color conversion method.

What is claimed is:

1. A printing device comprising:
   an ink system having a plurality of types of inks;
   an image input unit accepting an input of an image to be printed;
   a print condition selection unit accepting a selection of N types of print conditions used when printing the image, N being an integer equal to or greater than 2;
   an application rate input unit accepting an input of an application rate of each of the N types of print conditions that are selected;
   a first ink amount calculation unit calculating an expected amount of ink of each of the plurality of types of inks used when it is assumed that the image is printed using singly each of the N types of print conditions that are selected;
   a second ink amount calculation unit calculating an actual amount of ink used when printing the image, using the expected amount of ink corresponding to each of the N types of print conditions and the application rates of the N types of print conditions; and
   a printing unit executing printing of the image according to the actual amount of ink.

2. The printing device according to claim 1, wherein
   one of the N types of print conditions is a print condition that includes using M types of inks of the plurality of types of inks, M being an integer equal to or greater than 1, and
   another one of the N types of print conditions is a print condition that includes using an ink not including the M types of inks.

3. The printing device according to claim 2, wherein
   the plurality of types of inks include inks of three primary colors of pigment and a black ink, and
   the M types of inks is a spot color ink that is an ink other than the inks of the three primary colors of pigment and the black ink.

4. The printing device according to claim 1, wherein
   one of the N types of print conditions is a print condition that includes using a fluorescent ink, and
   another one of the N types of print conditions is a print condition that includes using an ink not including the fluorescent ink.

5. A printing method for printing using a plurality of types of inks, the printing method comprising:
   accepting an input of an image to be printed;

accepting a selection of N types of print conditions used when printing the image, N being an integer equal to or greater than 2;

accepting an input of an application rate of each of the N types of print conditions that are selected;

calculating an expected amount of ink of each of the plurality of types of inks used when it is assumed that the image is printed using singly each of the N types of print conditions that are selected;

calculating an actual amount of ink used when printing the image, using the expected amount of ink corresponding to each of the N types of print conditions and the application rates of the N types of print conditions; and executing printing of the image according to the actual amount of ink.

\* \* \* \* \*